United States Patent
Krishnan et al.

(10) Patent No.: US 8,301,739 B1
(45) Date of Patent: Oct. 30, 2012

(54) STORAGE SYSTEM INITIALIZATION UTILITY

(75) Inventors: Sriram Krishnan, Shrewsbury, MA (US); Andreas Bauer, Boxborough, MA (US); Greg W. Lazar, Upton, MA (US)

(73) Assignee: EMC Corporation, Hopkinton, MA (US)

(*) Notice: Subject to any disclaimer, the term of this patent is extended or adjusted under 35 U.S.C. 154(b) by 1743 days.

(21) Appl. No.: 11/021,355

(22) Filed: Dec. 23, 2004

(51) Int. Cl.
*G06F 15/177* (2006.01)

(52) U.S. Cl. ........ 709/222; 709/217; 709/220; 709/221; 711/100

(58) Field of Classification Search .......... 709/217–219; 711/100–114
See application file for complete search history.

(56) References Cited

U.S. PATENT DOCUMENTS

| | | | |
|---|---|---|---|
| 5,366,388 A | 11/1994 | Freeman et al. | 439/540.1 |
| 5,589,665 A | 12/1996 | Scamacca | 174/67 |
| 5,761,705 A * | 6/1998 | DeKoning et al. | 711/113 |
| 5,842,030 A | 11/1998 | Larabell et al. | 713/340 |
| 6,233,730 B1 | 5/2001 | Todd et al. | 717/108 |
| 6,328,590 B1 | 12/2001 | Linnell | 439/352 |
| 6,363,457 B1 * | 3/2002 | Sundberg | 711/114 |
| 6,411,526 B1 | 6/2002 | Nguyen et al. | 361/829 |
| 6,480,882 B1 | 11/2002 | McAdam et al. | 709/202 |
| 6,633,905 B1 | 10/2003 | Anderson et al. | 709/219 |
| 6,662,241 B1 | 12/2003 | Bauer et al. | 710/8 |
| 6,678,639 B2 | 1/2004 | Little et al. | 702/188 |
| 6,681,282 B1 | 1/2004 | Golden et al. | 710/302 |
| 6,742,059 B1 | 5/2004 | Todd et al. | 710/19 |
| 6,748,581 B1 | 6/2004 | Bauer et al. | 717/107 |
| 6,754,718 B1 | 6/2004 | Dobberpuhl et al. | 709/250 |
| 6,789,206 B1 | 9/2004 | Wierzbicki et al. | 713/300 |
| 6,839,746 B1 * | 1/2005 | Muthiyan et al. | 709/220 |
| 6,839,750 B1 | 1/2005 | Bauer et al. | 709/223 |
| 6,873,268 B2 | 3/2005 | Lebel et al. | 340/870.16 |
| 6,939,161 B1 | 9/2005 | Yi et al. | 439/373 |
| 6,971,090 B1 | 11/2005 | Gruttadauria et al. | 717/136 |
| 6,993,676 B2 * | 1/2006 | Corbin et al. | 714/5 |
| 7,010,622 B1 | 3/2006 | Bauer et al. | 709/252 |
| 7,043,715 B1 | 5/2006 | Bauer et al. | 717/107 |
| 7,054,910 B1 | 5/2006 | Nordin et al. | 709/208 |
| 7,110,402 B2 * | 9/2006 | Block et al. | 370/389 |
| 7,111,181 B2 * | 9/2006 | Bell | 713/300 |
| 7,113,995 B1 * | 9/2006 | Beukema et al. | 709/229 |
| 7,134,053 B1 * | 11/2006 | Moore | 714/47 |
| 7,216,200 B2 * | 5/2007 | Zhang et al. | 711/114 |
| 7,328,260 B1 * | 2/2008 | Muthiyan et al. | 709/224 |
| 7,401,338 B1 * | 7/2008 | Bowen et al. | 719/328 |
| 7,506,040 B1 * | 3/2009 | Rabe et al. | 709/223 |
| 7,577,729 B1 * | 8/2009 | Umbehocker et al. | 709/223 |
| 7,636,772 B1 * | 12/2009 | Kirby et al. | 709/221 |
| 2003/0051014 A1 * | 3/2003 | Gluska et al. | 709/222 |
| 2003/0101228 A1 * | 5/2003 | Busser et al. | 709/214 |
| 2004/0066622 A1 | 4/2004 | Wang | 361/695 |
| 2004/0078467 A1 * | 4/2004 | Grosner et al. | 709/226 |
| 2004/0103189 A1 * | 5/2004 | Cherkasova et al. | 709/224 |

(Continued)

*Primary Examiner* — Mohamed Ibrahim
(74) *Attorney, Agent, or Firm* — BainwoodHuang (57) ABSTRACT

Methods for initializing a storage system over a network are described. A server initialization utility operates on each of several storage processing units. A client initialization utility operates on a client computing device. The client initialization utility and server initialization utility communicate via a network coupled to the client computing device and the storage processing units. The client initialization utility is used to initialize parameters for each storage processing unit via communication with the corresponding server initialization utility. The client initialization utility is further used to discover array and storage processing identification information. The client and server initialization utilities communicate via exchange of UDP broadcast datagrams.

2 Claims, 10 Drawing Sheets

U.S. PATENT DOCUMENTS

| | | | |
|---|---|---|---|
| 2004/0236868 A1* | 11/2004 | Martin et al. | 709/245 |
| 2005/0025122 A1* | 2/2005 | Block et al. | 370/351 |
| 2005/0044196 A1* | 2/2005 | Pullen et al. | 709/223 |
| 2005/0076260 A1* | 4/2005 | Hung | 714/6 |
| 2005/0086427 A1* | 4/2005 | Fozard et al. | 711/111 |
| 2005/0149716 A1* | 7/2005 | Nair et al. | 713/1 |
| 2005/0223169 A1* | 10/2005 | Dallmann et al. | 711/114 |
| 2005/0234941 A1* | 10/2005 | Watanabe | 707/100 |
| 2006/0095663 A1* | 5/2006 | Franklin | 711/114 |
| 2008/0066153 A1* | 3/2008 | Burton et al. | 726/2 |

* cited by examiner

| 42 | |
|---|---|
| 2162 | 2162 |
| UDP LENGTH | UDP CHECKSUM |
| TYPE = DISCOVERY RESPONSE | |
| ARRAY SER. No | |
| ARRAY NAME | |
| SP SIGNATURE | |
| IP ADDRESS | |
| SUBNET MASK | |
| DEFAULT GATEWAY | |

FIG. 8

| 50 | |
|---|---|
| 2162 | 2162 |
| UDP LENGTH | UDP CHECKSUM |
| TYPE = ARRAY INITIALIZATION REQUEST | |
| ARRAY SER. No | |
| ARRAY NAME | |
| SP SIGNATURE | |
| IP ADDRESS | |
| SUBNET MASK | |
| DEFAULT GATEWAY | |

STORAGE SYSTEM INITIALIZATION UTILITY

FIELD OF THE INVENTION

The present invention relates generally to the field of device initialization, particularly to networked client server initialization utilities for storage systems.

BACKGROUND OF THE INVENTION

In today's computing environments, system performance is increasing as costs are decreasing. High performance computing systems are now available to and used by many more entities, including enterprises and small businesses. As these high performance systems enter the smaller, higher volume markets, cost pressures become more critical. There is an increasing need for high performance, low cost storage systems for use in these environments.

The high performance storage systems of today have very complicated initialization procedures. For example, a high performance storage system may include many storage arrays. Each array may include multiple storage processing units. In order to initialize the storage system for operation in the computing environment, an individual must plug a serial cable into a serial port on one storage processing unit in one array. A remote access server (RAS) connection must then be established to the array, and then a Point-to-Point (PPP) stack must be built. The initialization parameters for the storage processing unit are then entered. The serial cable is then unplugged and plugged into the next storage processing unit in the array, and the process repeated. This process is repeated for every single storage processing unit in every array in the storage system. The initialization process takes many hours and is much too complex to be performed by the customer. Rather, it is performed by a service engineer. The slow and complicated initialization process adds significant overall cost to the storage system. It would be highly desirable to provide a storage system initialization method that would reduce initialization time and complexity and thus reduce the cost of storage systems.

SUMMARY OF THE INVENTION

In accordance with the principles of the invention, apparatus, methods, and computer program products are provided for initializing a storage system over a network. A server initialization utility operates on each of a plurality storage processing units. A client initialization utility operates on a client computing device. The client initialization utility and server initialization utility communicate via a network coupled to the client computing device and the storage processing units. The client initialization utility is used to discover array and storage processing identification information, and to initialize parameters for each storage processing unit via communication with the corresponding server initialization utility.

More particularly, the client initialization utility includes logic for sending a discovery request message to the server initialization utilities via the network, and logic for receiving a discovery response message from each server initialization utility via the network. The client initialization utility also includes logic for sending an array initialization request message including initialization parameters to at least one server initialization utility via the network, and logic for receiving an array initialization response message from the at least one server initialization utility via the network. The server initialization utility includes logic for receiving the discovery request message from the client utility via the network, and logic for sending the discovery response message to the client utility via the network in response to the discovery request message, the discovery response message including current parameters. The server initialization utility also includes logic for receiving the array initialization request message from the client utility via the network; logic for applying the initialization parameters to replace the current parameters; and logic for sending an array initialization response message to the client utility via the network in response to the array initialization request message. The array initialization response message includes a status indication indicating whether the initialization parameters were successfully applied. The array initialization response message can further include array and storage processing identification information. The initialization parameters comprise an IP address, a subnet mask and a gateway address.

In accordance with an embodiment, the storage processing units initially contain invalid IP addresses. Yet the client and server initialization utilities must be able to communicate over the network to set the storage processing units' IP addresses. The client initialization utility and the server initialization utility therefore communicate via the network by using UDP datagrams; in particular, UDP broadcast datagrams. Network communications can thereby be achieved when the current parameters include an invalid IP address. Furthermore, because a discovery request is sent from the client initialization utility to all the server initialization utilities, rather than each server initialization utility sending a "discover me" type message, UDP broadcasts are minimized and network bandwidth is preserved.

The client server network initialization methods of the invention greatly increase the speed of the initialization process, and simplify the process significantly over previous initialization methods. The cost of the storage system is thereby advantageously decreased, both because time is saved and because the customer can perform the process without the need for hiring a service engineer.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

In accordance with the principles of the invention, a storage system is initialized over a network. The storage system is a collection of arrays, each array having several storage processing units. A server initialization utility operates on each storage processing unit. A client initialization utility operates on a client computing device, such as a personal computer or laptop. The client computing device is coupled to the storage processing units via a network. The client initialization utility is used to discover array and storage processor identification information and to initialize parameters for each storage processing unit via communication with the corresponding server initialization utility over the network.

Figure 1:
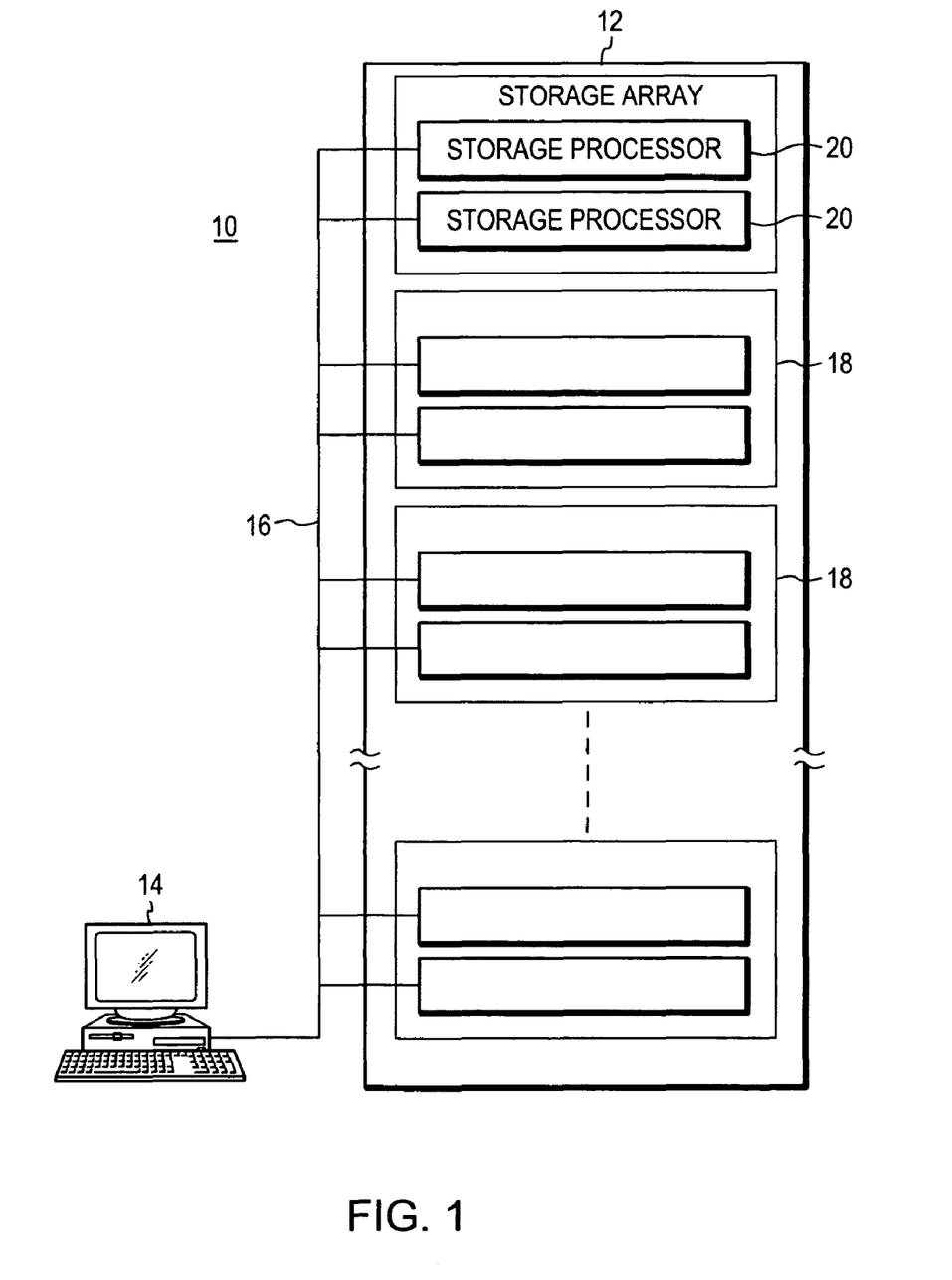
FIG. 1 is a schematic view of a system in which the invention is implemented.

Referring to FIG. 1, there is shown a system 10 in which the invention is incorporated. A storage system 12 is coupled to a client computer 14 via a network 16. The storage system 12 includes multiple storage arrays 18. Each storage array 18 includes a pair of storage processors 20. The network 16 is coupled to each of the storage processors 20 in the storage system 12. The network 16 may be, for example, an Ethernet network. The client computer may be a personal computer, laptop, workstation, or the like. The client computer may employ any of various operating systems such as Microsoft Windows, NT, or Linux.

Upon installation into the storage system 12, each storage array 18 in the storage system 12 must be initialized. Each storage processor 20 has associated with it a set of parameters to be initialized. These parameters may be, for example, any or all of the following: IP address, Subnet mask, gateway IP address, user name, and password. In accordance with the principles of the invention, a user initializes these parameters for all the storage processors 20 in the storage arrays 18 via the client computer 14 over the network 16.

Figure 2:
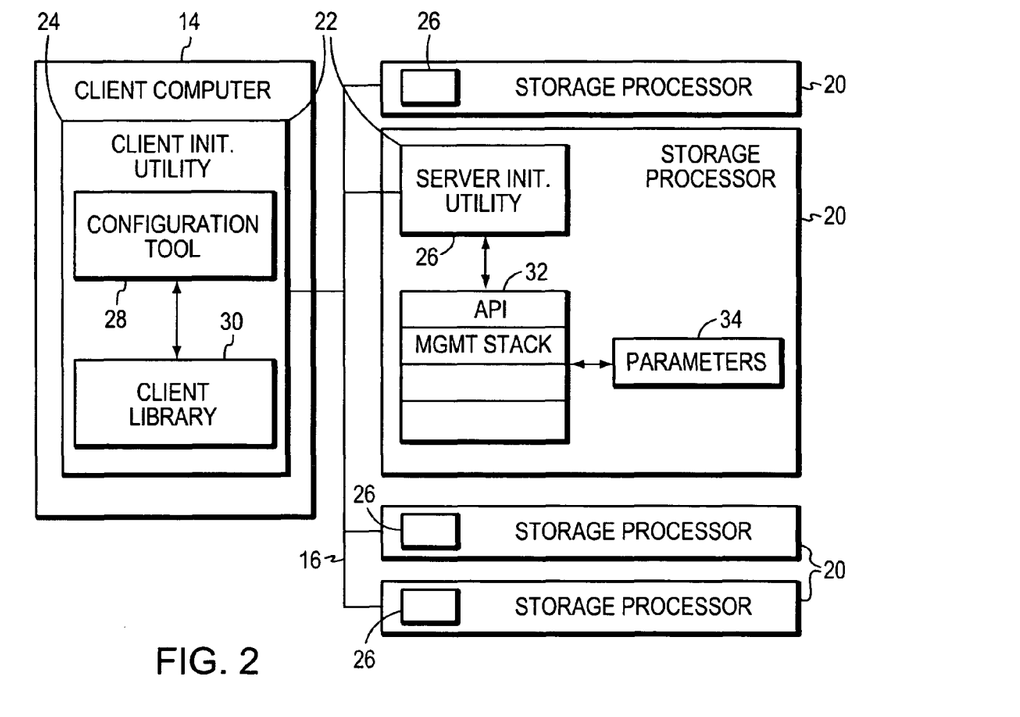
FIG. 2 is a block diagram of the storage initialization utility of the invention, showing the client initialization utility and the server initialization utility.

Referring to FIG. 2, there is shown the storage initialization utility 22 of the invention. The storage initialization utility 22 follows a client-server architectural model. A client initialization utility 24 resides on the client computer 14 and communicates via the network 16 with server initialization utilities 26 on each storage processor 20. The client initialization utility 24 consists of a configuration tool 28 and a client initialization library 30. The configuration tool 28 is the interface used by the user for setting the initialization parameters. This interface may be a GUI based application such as a web page, or it may be a text based application. The client initialization library 30 implements the functionality for communication with each server initialization utility 26. The server initialization utility 26 is shown as layered over storage management software 32. Various storage systems are managed by different management software utilities. Some of these management utilities provide an API or like mechanism for exposing initialization parameters 34 such as those previously described. The server initialization utility 26 interacts with the management software 32 to set the parameters 34 to the initialization values it receives from the client initialization utility 24. As shown here it does so via use of management software APIs, but it may alternately be integrated into the management software 32.

Figure 3:
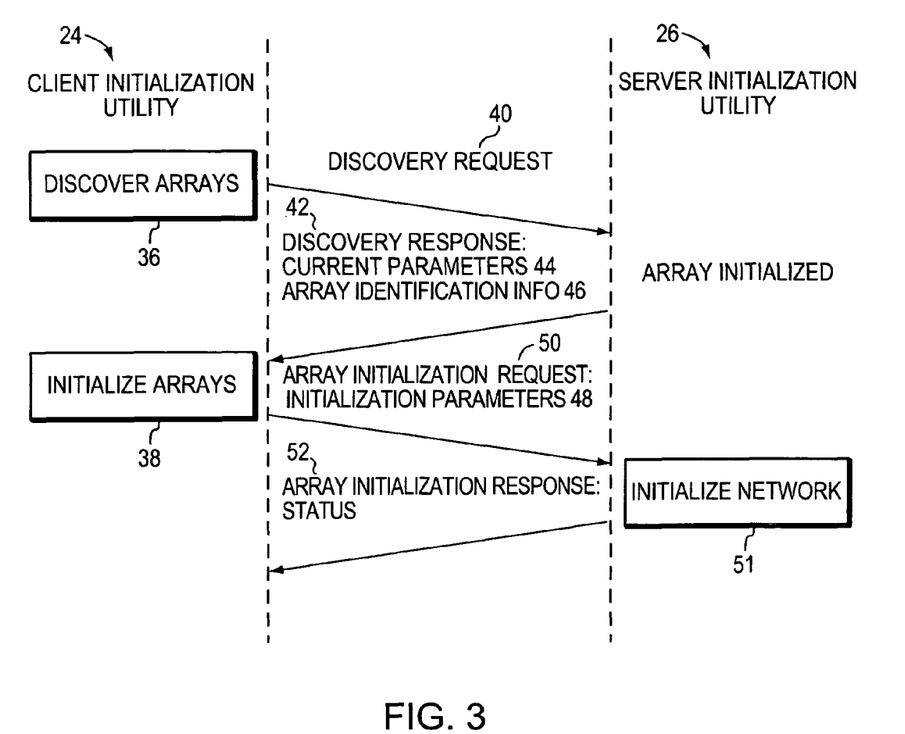
FIG. 3 is a state diagram of the operation of the client initialization utility and server initialization utilities.

The operation of the storage initialization utility 22 is shown generally in FIG. 3. A user interacts with the configuration tool 22 in the client utility 24 to send a discovery request message 40 to all the storage processors 20 over the network 16. A discovery response message 42 is sent by each storage processor 20 in each array 18 back to the client utility 24 in response to the discovery request message 40. The discovery response message 42 contains the current values for the parameters 34—referred to as "current parameters" 44, and array identification parameters 46 to be further described. For each array discovered, the user interacts with the client initialization utility 24 to set the received parameters to their initialization values—referred to as "initialization parameters" 48. An array initialization request message 50 including the initialization parameters 48 is sent from the client initialization utility 24 to the server initialization utility 26. The server initialization utility 26 applies the received initialization parameters 48 to replace the current parameters 44, thus initializing the network. The server initialization utility 26 then sends an array initialization response message 52 to the client initialization utility 24. The array initialization response message 52 includes status information indicating whether the initialization parameters 48 were successfully applied.

Figure 4:
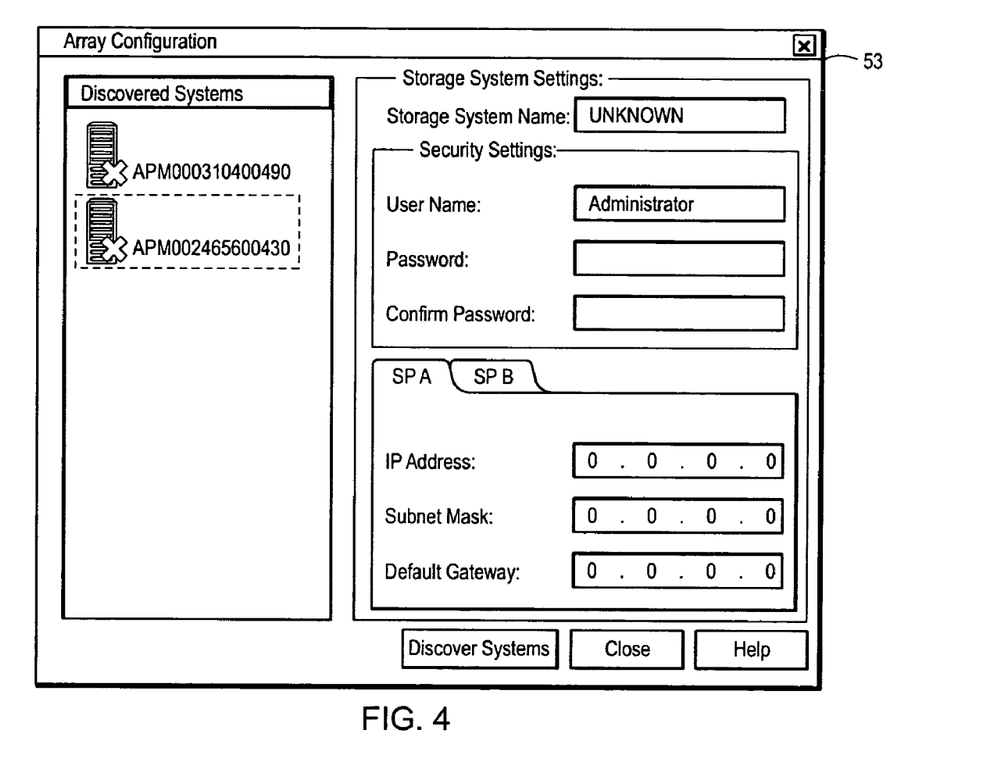
FIG. 4 is a screen shot of the configuration tool portion of the client initialization utility.

In FIG. 4, there is shown a screen shot of one possible implementation of the configuration tool 22 for the client initialization utility 24, as it would be used to set initialization parameters. Shown is the GUI interface after a discovery response message 42 has been received. Discovered arrays are shown on the left of the screen. Current parameters 44, consisting of user name, password, IP address, subnet mask, and default gateway are shown for a storage processor 20 in the selected array 18. To initialize the array 18, the user types initialization parameters 48 over the current parameters 44 shown. If the array 18 includes a second storage processor 20, the user then selects the tab for the storage processor 20 and enters its initialization parameters 48. Once the user has completed this task, the client initialization utility 24 validates the entered initialization parameters and sends an array initialization request message 50 to each storage processor 20. The server initialization utility 26 on each storage processor 20 receives the initialization parameters 48, applies them, and sends the array initialization response message 52 to the client utility to notify the utility that either the initialization was successful, or the initialization was unsuccessful, due to the fact for example that the array was already initialized or that an IP address conflict has been identified.

It is noted that the particular GUI shown is one of many different possible user interfaces that could be employed for setting initialization parameters, and the invention is not limited by the interface employed. The user interface could display the content in a different format, or as a subset of other content. The interface might be part of a "wizard" install application on a Windows system. The interface could even be a text command line interface.

Figure 5:
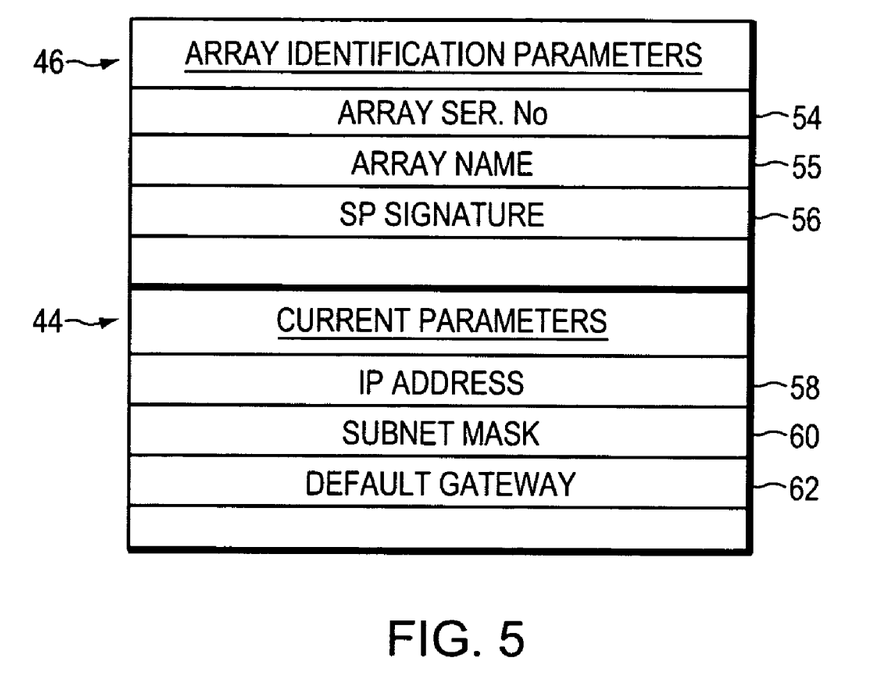
FIG. 5 is a representation of the array identification parameters and current parameters stored by the server initialization utility.

The content of the discovery response message 42 is now further described. Since the client initialization utility 24 will receive multiple discovery response messages 42, it must have a way to identify each storage processor 20 in each array 18. The array identification parameters 46 are provided by the server initialization utility 26 in the discovery response messages 42 for this purpose. Each storage array 18 has a serial number 54 associated with it. Each storage processor 20 in the array 18 also has its own serial number. These serial numbers are used to in combination to identify each storage processor 20 in the storage system 12. The combination of serial numbers is used to produce a storage processor signature 56. For example, the combination of the array serial number 54 with a first storage processor serial number produces a first storage processor signature 56. The combination of the array serial number 5 with a second storage processor serial number produces a second, different storage processor signature 56. So, as shown in FIG. 5, each storage processor 20 stores array identification parameters 46 including: the array serial number 54, an array name 55 (provided by the client initialization utility), and the storage processor signature 56. The storage processor 20 also stores the current parameters 44 including an IP address 58, a subnet mask 60, and an IP gateway address 62. All these parameters are sent to the client initialization utility in the discovery response message 42, as was described.

Figure 6:
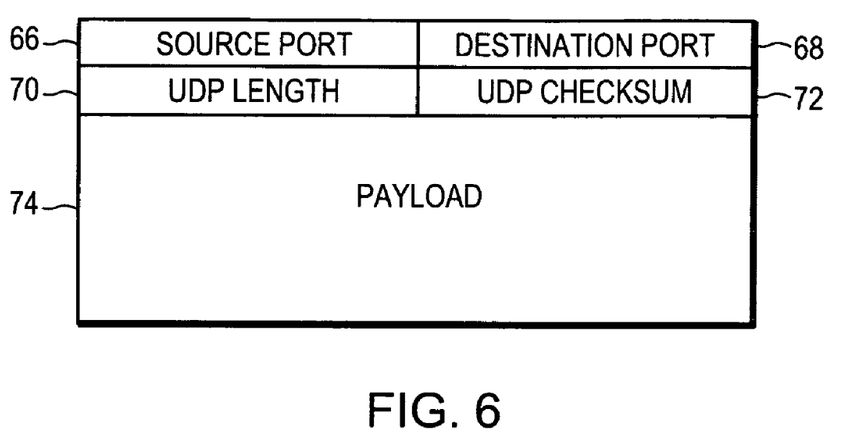
FIG. 6 is a representation of a UDP broadcast packet.

In accordance with a further aspect of the invention, each array 18 is shipped uninitialized with a "dummy" invalid IP address for each storage processor 20. The dummy IP addresses are all the same. The client initialization utility 24 must communicate over the network 16 with the server initialization utilities 26 despite the fact that the storage processors 20 contain invalid IP addresses. The client and server utilities therefore communicate by exchanging UDP (User Datagram Protocol) broadcast messages on a private UDP port. UDP is an unreliable, connectionless transport protocol that does not require that a connection be established with a device before exchanging data with it. A UDP broadcast message is addressed to IP address 255.255.255.255, causing it to be received by all devices listening on the port to which it is sent, regardless of their IP addresses. An example of a UDP broadcast message is shown in FIG. 6. The source port 66 and destination port 68 are the source and destination ports for the application exchanging the UDP message. The length field 70 records the length of the message, and the checksum field 72 used to verify the UDP payload and header. The UDP payload 74 contains the storage initialization utility 22 messages.

Figure 7:
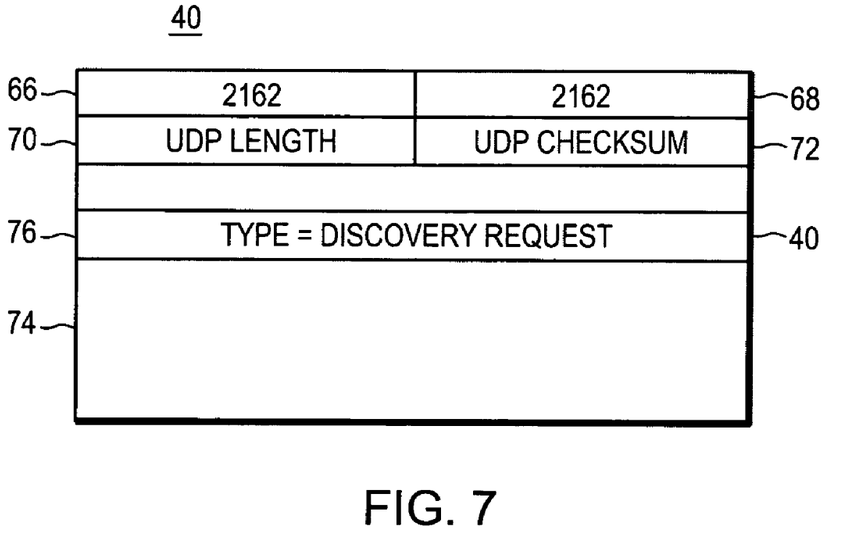
FIG. 7 is a representation of a discovery request packet in accordance with the invention.
Figure 8:
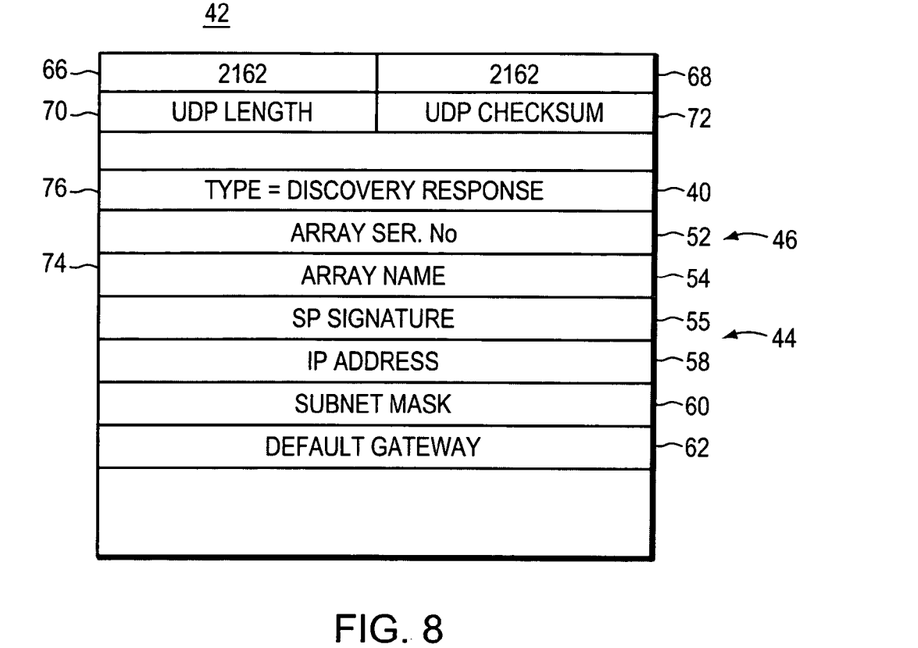
FIG. 8 is a representation of a discovery response packet in accordance with the invention.
Figure 9:
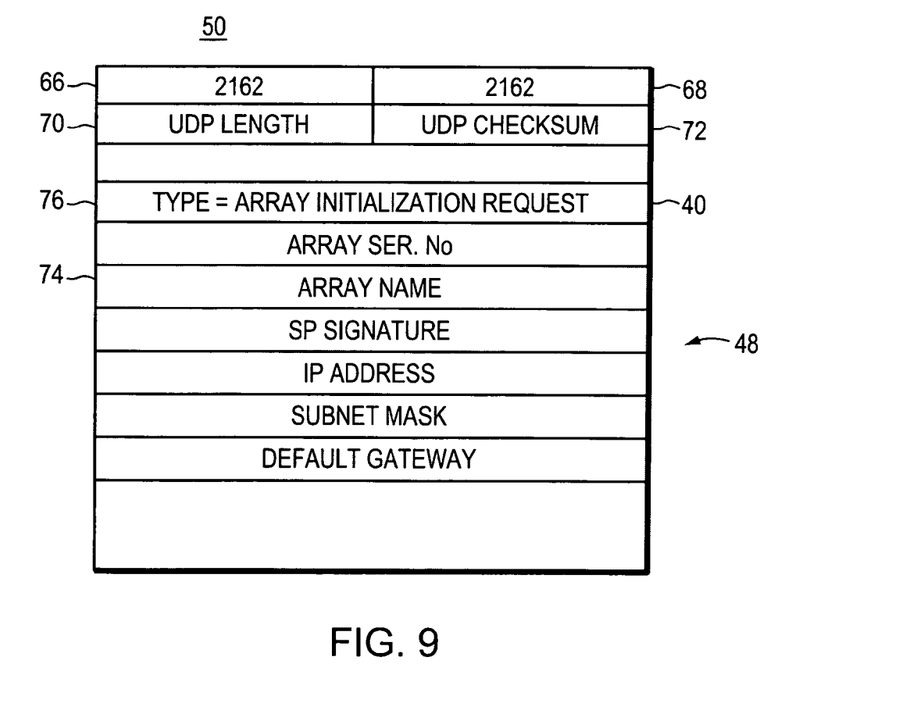
FIG. 9 is a representation of an initialization request packet in accordance with the invention.
Figure 10:
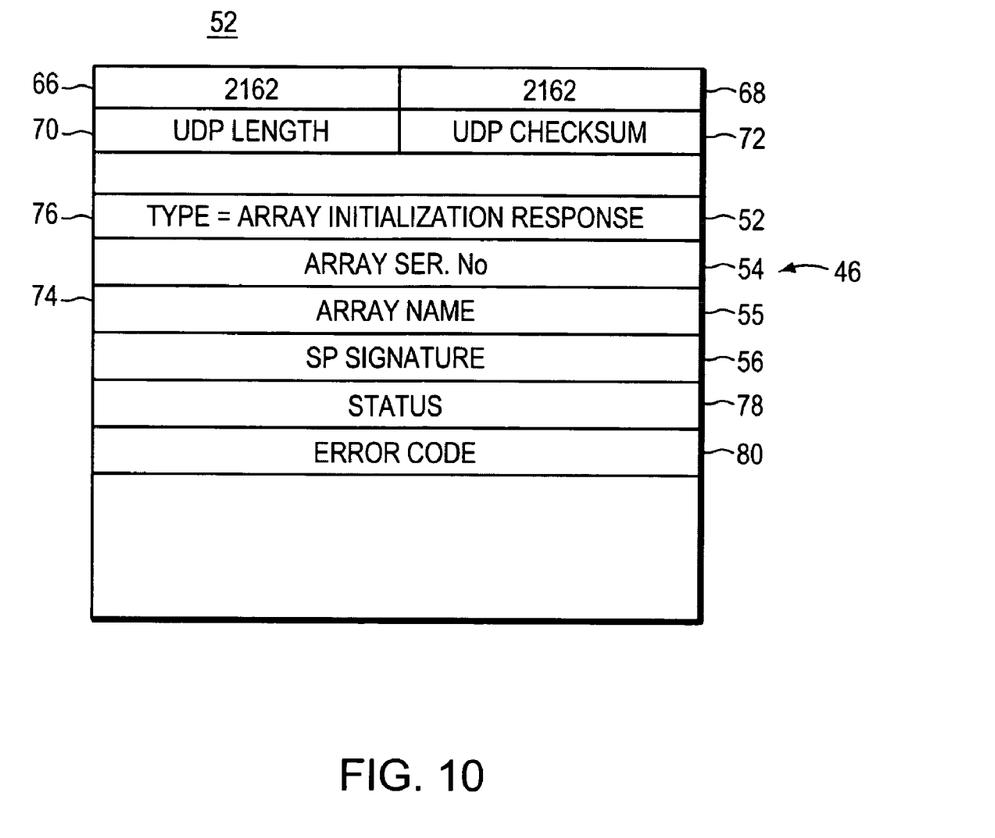
FIG. 10 is a representation of an initialization response packet in accordance with the invention.

The UDP broadcast messages used by the client and server initialization utilities 24, 26 in accordance with the preferred embodiment are shown in FIGS. 7-10. All messages sent to the storage processors 20 are broadcast on port 2162—a UDP port privately owned by EMC Corporation, Hopkinton, Mass. USA. The discovery request message 40, shown in FIG. 7, is a UDP broadcast message broadcast on port 2162. The payload 74 of the UDP message includes a type field 76 indicating that it is a discovery request message 40. The discovery response message 42, shown in FIG. 8, is a UDP broadcast message broadcast on port 2162. The type field 76 indicates that this is a discovery response message 42. The remainder of the payload 74 of the discovery response message 42 includes the current, uninitialized parameters 46 and the array identification parameters 44. The array initialization request message 50, shown in FIG. 8, is also a UDP broadcast message broadcast on port 2162. The type field 76 of this message indicates that it is an array initialization request message 50. The payload 74 of the array initialization request message 50 includes the initialization parameters 48. The array initialization response message 52, shown in FIG. 10, is a UDP broadcast message broadcast on port 2162. Its type field 76 indicates it is an array initialization response message 52. The payload 74 of the message identifies the array serial number 54, array name 55, and storage processor signature 56 sending the message, and includes a status field 78 and error code field 80 indicating whether the initialization was successful.

Figure 11:
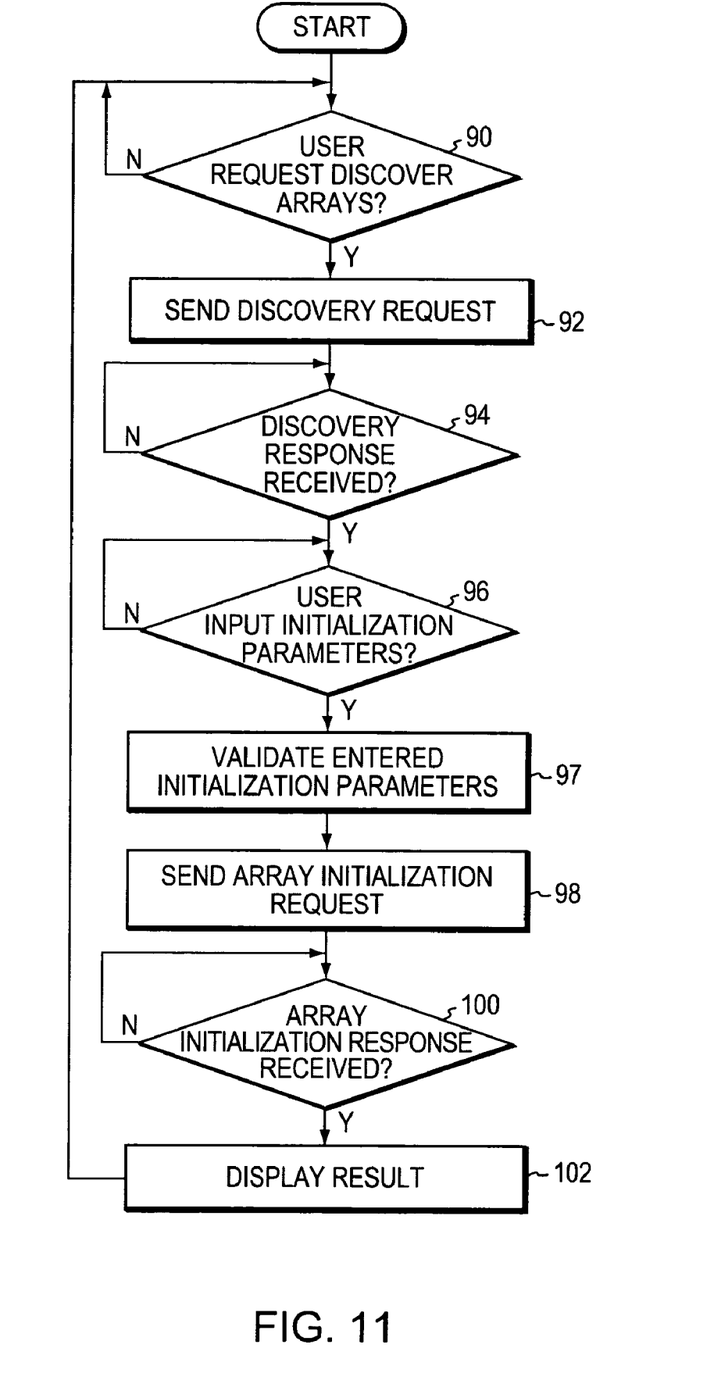
FIG. 11 is a flow diagram of the operation of the client initialization utility in accordance with the invention.

Referring to FIG. 11, there is shown the detailed operation of the client initialization utility 24. The user launches the configuration tool 28 on his computer or laptop 14 and requests to discover arrays (step 90). The client initialization utility 24 then sends a discovery request message 40 to the storage processors 20 in the arrays 18 (step 92). Since UDP is an unreliable, connectionless protocol, the client initialization utility may send the discovery request message 40 several times to better ensure its receipt by all the listening storage processors. For example, the discovery request message 40 may be sent three times at an interval of one second.

The client initialization utility now listens on UDP broadcast port 2162 for discovery response messages from the storage processors 20 (step 94). For each discovery response message received, the client initialization utility uses the array identification parameters 46 to identify and display the arrays, and displays the current parameters 44, as shown in FIG. 4. Once the user has input initialization parameters 48 for an array 18 (step 96), the client initialization utility 24 preferably validates the entered initialization parameters (step 97). For instance, the client initialization utility 24 may check to see if the entered IP parameters are valid by sending an ICMP ping to the entered IP address. If the ping is answered, then an IP address conflict exists. The user is notified of the conflict and prompted to enter another IP address. Once the initialization parameters 48 have been validated, the client initialization utility 24 sends an array initialization request message 50 containing the initialization parameters 48 (step 98). Upon receipt of an array initialization response message 52 from the array 18 (step 100), the client initialization utility displays the result to the user (step 102). The displayed result indicates whether the initialization parameters were successfully applied to the array, or whether an error has occurred.

Figure 12:
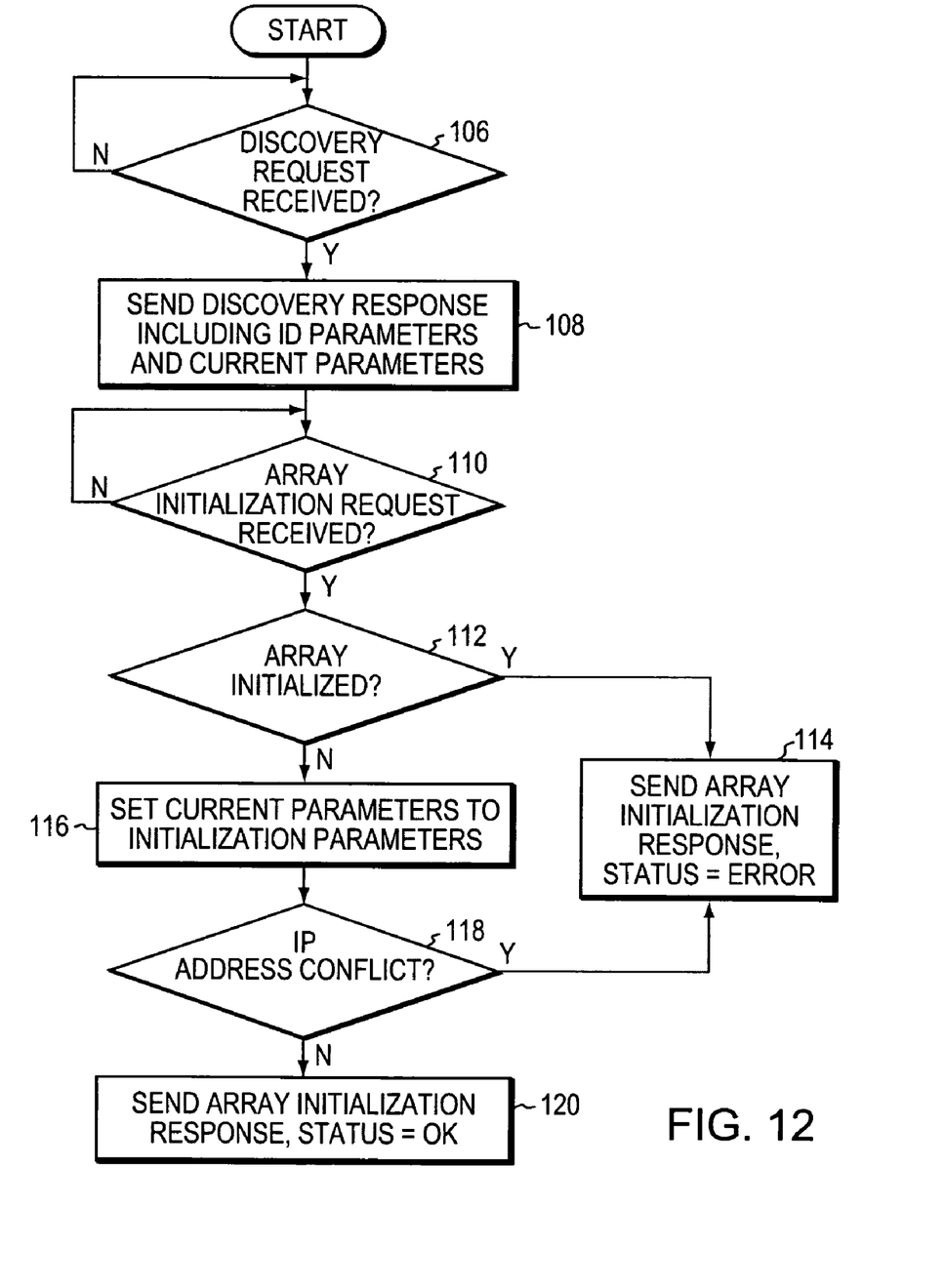
FIG. 12 is a flow diagram of the operation of the server initialization utility in accordance with the invention.

The operation of the server initialization utility is shown in FIG. 12. The server initialization utility listens for discovery request messages 40 from the client initialization utility 24 on UDP port 2162. Once a discovery request message 40 is received (step 106), the server initialization utility 26 sends a discovery response message 42 back to the client initialization utility 24 (step 108). The discovery response message 42 includes the array identification parameters 46 and the current parameters 44. The server initialization utility 26 continues to listen on UDP port 2162 for array initialization request messages 50 from the client initialization utility 24. In accordance with the preferred embodiment, when an array initialization request is received with the proper array serial number and SP signature (step 110), the server initialization utility 26 checks to see whether the array is already initialized (step 112). This may be indicated for example by a bit set upon completion of initialization. If the array 18 is already initialized, an array initialization response message 52 is sent with its status field 78 indicating an error and its error field 80 indicating that the array 18 is already initialized (step 114). If the array 18 is uninitialized, the server initialization utility 26 extracts the initialization parameters 48 from the array initialization request message 52 and applies them to replace its current parameters (step 116). The server initialization utility 26 then optionally checks to see if the network initialization parameters it has received are valid (step 118). This step is advantageous in an implementation where the client initialization utility does not validate initialization parameters entered by the user. For example, the server initialization utility 26 may check to see if the IP parameters are valid by sending a ping to its assigned IP address. If the ping is answered, then an IF address conflict exists and an array initialization response message 52 is sent with its status field 78 indicating an error and its error code field 80 indicating an IP address conflict (step 114). If the parameters 48 are valid, an array initialization response message 52 is sent to the client initialization utility with a status field 78 indicating that the initialization was successful (step 120).

It is noted that UDP broadcast packets can be expensive as they must be processed by all nodes listening on the UDP destination port. The architecture of the initialization protocol is advantageous in that the client initialization utility 24 sends a single discovery request message (with a few repeats for reliability) to all server initialization utilities to cause the server initialization utilities to provide their current parameters in a discover response message only on request. The server initialization utilities could alternately send "discover me" type requests at intervals, and this is not precluded by the invention, but it is more expensive in terms of network bandwidth.

Although the client and server initialization utilities herein described use UDP IP broadcast packets to exchange messages, other implementations are possible. UDP IP multicast could be used, where the client initialization utility and server initialization utilities are all members of the same IP multicast group. Another connectionless transport protocol besides UDP could also be employed—even a proprietary one. Furthermore, though a specific set of network initialization parameters have been discussed, it is understood that the invention can be used to initialize a great variety of system parameters.

In accordance with the preferred embodiment, the client initialization utility 24 and server initialization utility 26 of the invention are implemented in the XML programming language. The client initialization utility 24 is provided as a binary executable for the user. The server initialization utility is an embedded binary in the storage processor 20. It is understood, however, that many other known programming languages could be employed to implement the described functionality.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the invention. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes.

We claim:

1. A method comprising: sending a discovery request message from a client initialization utility operating on a client machine to a plurality of storage processors over a network, each storage processor controlling access to a storage array and each storage processor running a server initialization utility; receiving, over the network, at the client initialization utility, a discovery response message from a first server initialization utility running on a first storage processor of the plurality of storage processors, the discovery response message including: identification information uniquely identifying the first storage processor; and a set of current parameters, the set of current parameters representing default parameters assigned to the first storage processor; assigning, at the client initialization utility, a set of initialization parameters to the first storage processor; sending an initialization request message from the client initialization utility to the first server initialization utility over the network, the initialization request message including the assigned set of initialization parameters; and receiving, over the network, at the client initialization utility, an initialization response message from the first server initialization utility; wherein the set of current parameters includes: a default network address of the first storage processor; a default subnet mask for the first storage processor; and a default gateway network address for the first storage processor; wherein the default network address is an invalid network address; wherein sending the discovery request message includes broadcasting the discovery request message across the network; wherein broadcasting the discovery request message across the network includes: sending the discovery request message using an unreliable, connectionless transport protocol; sending the discovery request message to all devices on the network that are listening to a particular port wherein the particular port is a predefined agreed upon port; and sending copies of the discovery request message over the network a plurality of times to better ensure receipt by all of the plurality of storage processors; and wherein the method further comprises, at the first server initialization utility: determining that the assigned set of initialization parameters are invalid; and in response to determining that the assigned set of initialization parameters are invalid, generating the indication that the first server initialization utility was not able to successfully initialize the first storage processor using the assigned set of initialization parameters.

2. The method of claim 1 wherein determining that the assigned set of initialization parameters are invalid includes:
sending a ping to a network address identified by the assigned set of initialization parameters as being assigned to the first storage processor; and
receiving an answer to the ping.

* * * * *